(12) United States Patent
Cheng et al.

(10) Patent No.: US 8,773,655 B2
(45) Date of Patent: Jul. 8, 2014

(54) TOTAL LUMINOUS FLUX MEASUREMENT SYSTEM AND TOTAL LUMINOUS FLUX MEASURING METHOD

(75) Inventors: Hsu-Ting Cheng, Tao-Yuan Hsien (TW); Yueh-Hung Cheng, Tao-Yuan Hsien (TW)

(73) Assignee: Chroma Ate Inc., Tao-Yuan Hsien (TW)

( * ) Notice: Subject to any disclaimer, the term of this patent is extended or adjusted under 35 U.S.C. 154(b) by 0 days.

(21) Appl. No.: 13/614,140

(22) Filed: Sep. 13, 2012

(65) Prior Publication Data

US 2013/0321794 A1 Dec. 5, 2013

(30) Foreign Application Priority Data

May 30, 2012 (TW) .............................. 101119288 A

(51) Int. Cl.
*G01J 1/00* (2006.01)
*G01J 1/04* (2006.01)
*G01J 1/42* (2006.01)

(52) U.S. Cl.
CPC . *G01J 1/4257* (2013.01); *G01J 1/42* (2013.01)
USPC .......................................... 356/236; 356/213

(58) Field of Classification Search
CPC .... G01J 2001/0481; G01J 1/42; G01J 1/4257
USPC .................................. 356/213–236
See application file for complete search history.

(56) References Cited

U.S. PATENT DOCUMENTS 7,804,589 B2 * 9/2010 Tseng et al. ................. 356/213

* cited by examiner

*Primary Examiner* — Michael P Stafira
(74) *Attorney, Agent, or Firm* — Rosenberg, Klein & Lee

(57) ABSTRACT

The present invention relates to a total luminous flux measurement system and a method thereof for measuring a total luminous flux of a light emitting component. The total luminous flux measurement system includes a light receiving module, a first light detector and a processing module. The light receiving module is disposed on a central normal of the light emitting component and divides a projection light field to a forward light field and a side light field. The light receiving module receives a beam in the forward light field to obtain a forward luminous flux. The first light detector is disposed on a side of the light receiving module to receive a beam in the side light field to obtain a first side luminous flux. The processing module electrically connects the light receiving module and the first light detector to calculate the total luminous flux at the light emitting component.

6 Claims, 8 Drawing Sheets

TOTAL LUMINOUS FLUX MEASUREMENT SYSTEM AND TOTAL LUMINOUS FLUX MEASURING METHOD

This application claims the benefits of the Taiwan Patent Application Serial NO. 101119288 filed on May 30, 2012 the subject matter of which is incorporated herein by reference.

BACKGROUND OF THE INVENTION

1 Field of the Invention

A total luminous flux measurement system and a total luminous flux measuring method is provided according to the present invention; more particularly, field patterns of a light emitting component are calibrated and calculated so that the accuracy of inspecting the total luminous flux is enhanced.

2 Description of the Prior Art

LEDs have many advantages such as lower energy consumption, longer lifetime, faster reaction speed, etc.; therefore, LEDs have enormous potential and are highly praised. In the industrial chain of LEDs, epitaxial wafers are manufactured and then integrated as LED wafers; LED wafers are cut into LED chip dies, which are then packaged in various forms. The luminous efficiency of LEDs has been, a target that manufacturers go for. Thus, the luminous flux of LEDs is inspected all the time during the whole process of manufacturing so as to confirm whether the luminous efficiency of LEDs meets the expectation.

According to present total luminous flux measurement system, integrating spheres and solar panels are utilized for covering the emitting direction of LEDs so as to calculate the total luminous flux by converting the current value measured. Although the method is convenient, it is problematic. For example, the size of the openings of integrating spheres is limited and if the openings are too big, the current to be measured is too small and thus the accuracy is low. In order to cover as much luminous emitted from LEDs as possible, integrating spheres are put very close to LEDs—LED chip dies are sent inside the integrating spheres via jigs for measuring. As a result, although an measurement system utilizing integrating spheres has greater accuracy, it takes more time and does not suitable for quickly measuring uncut LED chip dies on LED wafers.

A measurement system utilizing solar panels utilizes photovoltaic cells as a light receiving component. Photovoltaic cells have advantages such as larger light receiving area, single crystal silicon being more stable, better repeatability of output current, shorter response time, etc. and thus effectively reduces errors occurred due to light receiving percentage brought by structural differences in microscope point measuring system. However, although in the measurement system utilizing solar panels, light receiving amount can be increased by enlarging the size of solar panels, its efficiency greatly depends on the incident angles so that the measuring result has many errors.

Refer to FIG. 1, which is a diagram showing a relation between incident angles and absorption efficiency when a beam is directed to a solar panel in prior art. The incident angles in FIG. 1 represent an angle between the beam and a normal of a solar panel. When the incident angle is 0 degree, the beam is incident on the solar panel vertically and thus the absorption efficiency is the highest. However, the larger the incident angle is, the lower the absorption efficiency becomes because the beam reflects more easily when the incident angle is larger; as a result, the absorption efficiency becomes lower. In conclusion, when solar panels are utilized as light receiving components for inspecting the total luminous flux of LEDs, errors tend to occur, and errors differ among various field patters of projection fields of LEDs.

Thus, a total luminous flux measurement system for measuring a total luminous flux of a light emitting component is provided according to the present invention so as to improve the accuracy of inspecting the total luminous flux of a light emitting component.

SUMMARY OF THE INVENTION

In prior art, a method of inspecting LEDs via integrating spheres merely suitable for a single LED chip die and not for an LED wafer; besides, the method is time-consuming and not ideal for busy production line. Although utilizing solar panels as light receiving components requires less time and is more stable, the measuring result has more errors due to solar panels' highly dependence on incident angles.

Therefore, a total luminous flux measurement system for measuring a total luminous flux of a light emitting, component is provided according to the present invention so as to quickly inspect the luminous flux of a light emitting component and to improve the accuracy of measurement.

A total luminous flux measurement system for measuring a total luminous flux of a light emitting component is provided, the light emitting component having a projection light field and a central normal, the total luminous flux measurement system comprising a light receiving module, a first light detector and a processing module.

The light receiving module is disposed on the central normal, divides the projection light field into a forward light field and a side light field and receives a beam projected by the light emitting component in the forward light field to obtain a forward luminous flux.

The first light detector is disposed on a side of the light receiving module and receives a beam projected by the light emitting component in the side light field to obtain a first side luminous flux.

The processing module electrically connects the light receiving module and the first light detector and calculates the total luminous flux of the light emitting component by determining a field pattern of the projection light field according to the forward luminous flux and the first side luminous flux.

The system further includes a second light detector disposed opposite to the first light detector on the light receiving module, the second light detector receiving a beam projected by the light emitting component in the side light field to obtain a second side luminous flux. Preferably, the processing module includes a storage unit and a processing unit. The storage unit stores a forward standard luminous flux, a first side standard luminous flux, a second side standard luminous flux and a plurality of calibration coefficients of field patterns. The processing unit respectively compares the forward luminous flux, the first side luminous flux and the second side luminous flux with the forward standard luminous flux, the first side standard luminous flux and the second side luminous flux so as to determine the field pattern of the projection light field and to calculate the total luminous flux of the light emitting component by selecting the calibration coefficients of field patterns corresponding to the field pattern of the projection light field.

The system further includes two light concentrating components disposed respectively on two sides of the light receiving module, the two light concentrating components concentrating beams projected by the light emitting component in the side light field respectively on the first light detector and the second light detector.

A total luminous flux measuring method is provided. The method includes disposing a light receiving module on a central normal of a light emitting component so that a projection light field of the light emitting component is divided into a forward light field and a side light field; the light receiving module receiving a beam projected by the light emitting component in the forward light field to obtain a forward luminous flux; a first light detector receiving a beam projected by the light emitting component in the side light field to obtain a first side luminous flux; and a processing module calculating a total luminous flux of the light emitting component by determining a field pattern of the projection light field according to the forward luminous flux and the first side luminous flux.

The method further includes inspecting a standard light emitting component so the light receiving module obtains a forward standard luminous flux and the first light detector obtains a first side standard luminous flux.

Preferably, determine that the field pattern of the projection light field is close to a field pattern of the projection light field of the standard light emitting component when a ratio value of the forward luminous flux and the first side luminous flux is equal to a ratio value of the forward standard luminous flux and the first side standard luminous flux; determine that the field pattern of the projection light field concentrates on the central normal when a ratio value of the forward luminous flux and the first side luminous flux is bigger than a ratio value of the forward standard luminous flux and the first side standard luminous flux; and determine that the field pattern of the projection light field is dispersive when a ratio value of the forward luminous flux and the first side luminous flux: is smaller than a ratio value of the forward standard luminous flux and the first side standard luminous flux.

The method further includes a second light detector receiving a beam projected by the light, emitting component in the side light field to obtain a second side luminous flux, the second light detector determining that the field pattern of the projection light field is biased when the first side luminous flux and the second side luminous flux are different.

Compared with prior art, the total luminous flux measurement system and the total luminous flux measuring method according to the present invention include utilizing the light receiving component and the light detector to absorb beams in the projection field of the light emitting component, comparing the forward luminous flux and the first side luminous flux with the standard luminous flux and the first side standard luminous flux so as to determine the field pattern of the projection light field, and calculating the total luminous flux of the light emitting component by selecting the calibration coefficients of field patterns corresponding to the field pattern of the projection light field.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

The present invention relates to a total luminous flux measurement system and a total luminous flux measuring method, wherein beams emitted by a light emitting component in a projection light field are absorbed by a light receiving module and a light detector, compared with a luminous flux of a standard light emitting component so that a field pattern of the projection light field of the light emitting component is determined and the total luminous flux of the light emitting component is calibrated. Since there are various field patterns of projection light fields of light emitting components, and since the light emitting components are in different shapes during manufacturing processes, in the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
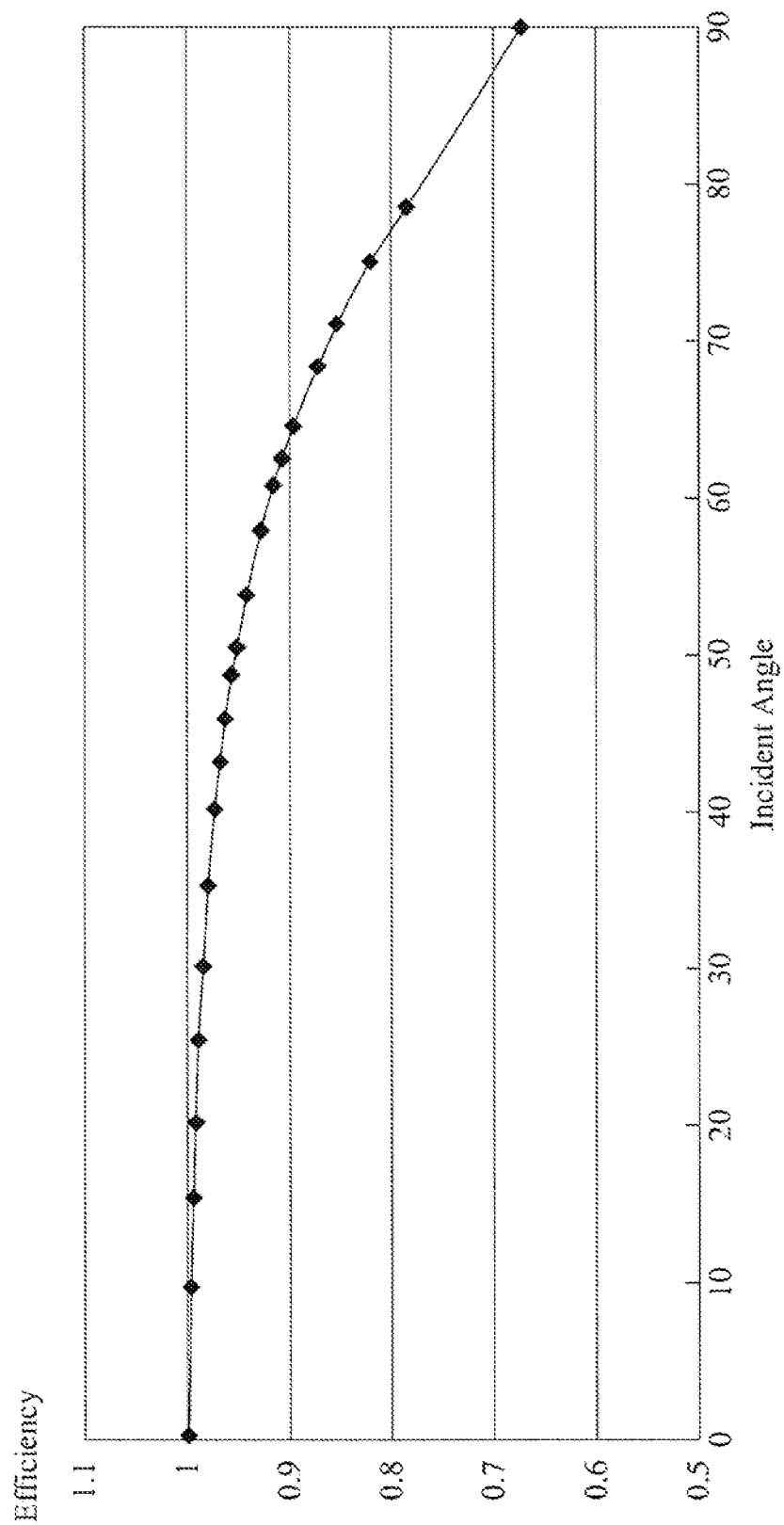
FIG. 1 is a diagram showing a relation between incident angles and absorption efficiency when a beam is directed to a solar panel in prior art.
Figure 2:
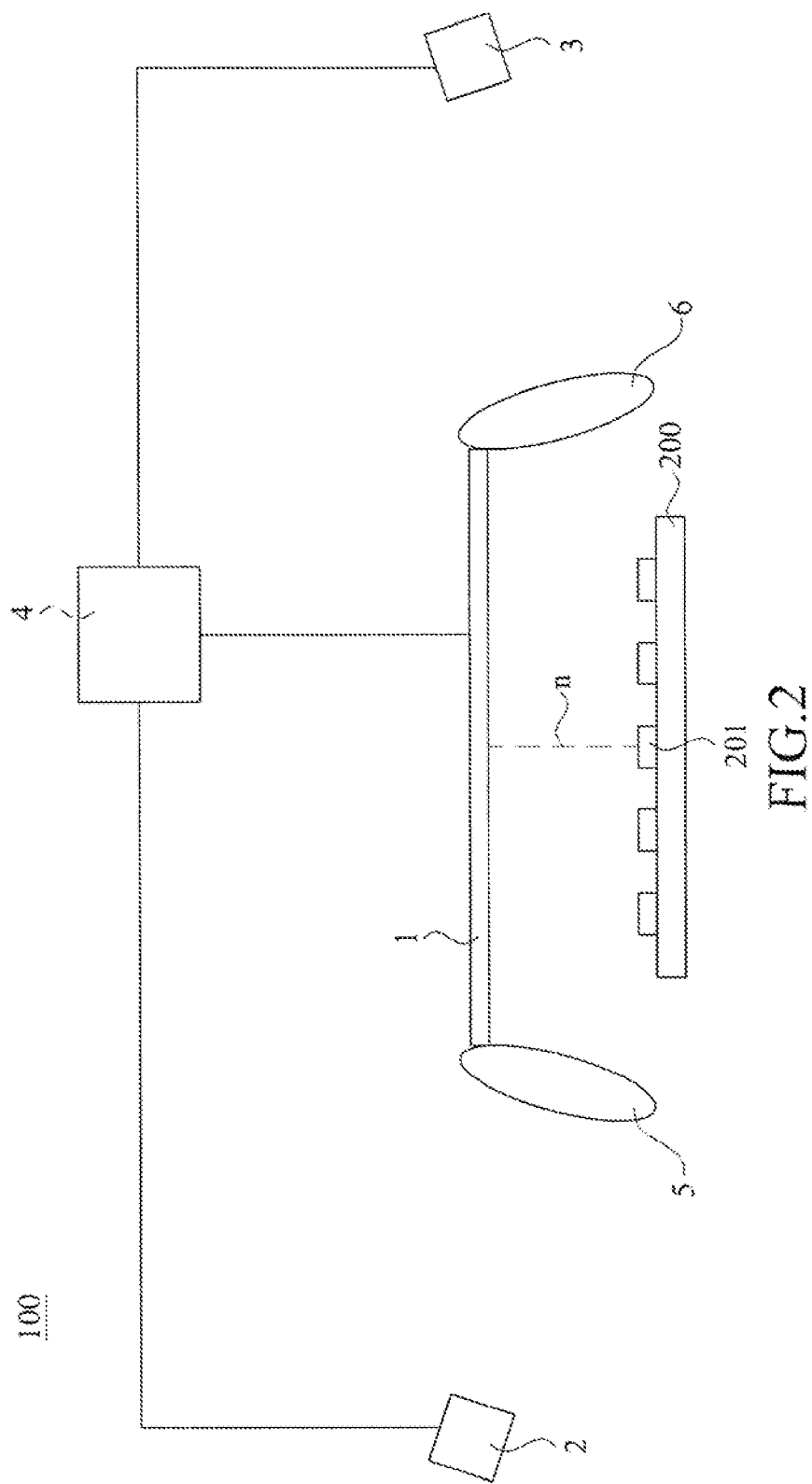
FIG. 2 is a perspective view showing a total luminous flux measurement system according to an embodiment of the present invention.
Figure 3:
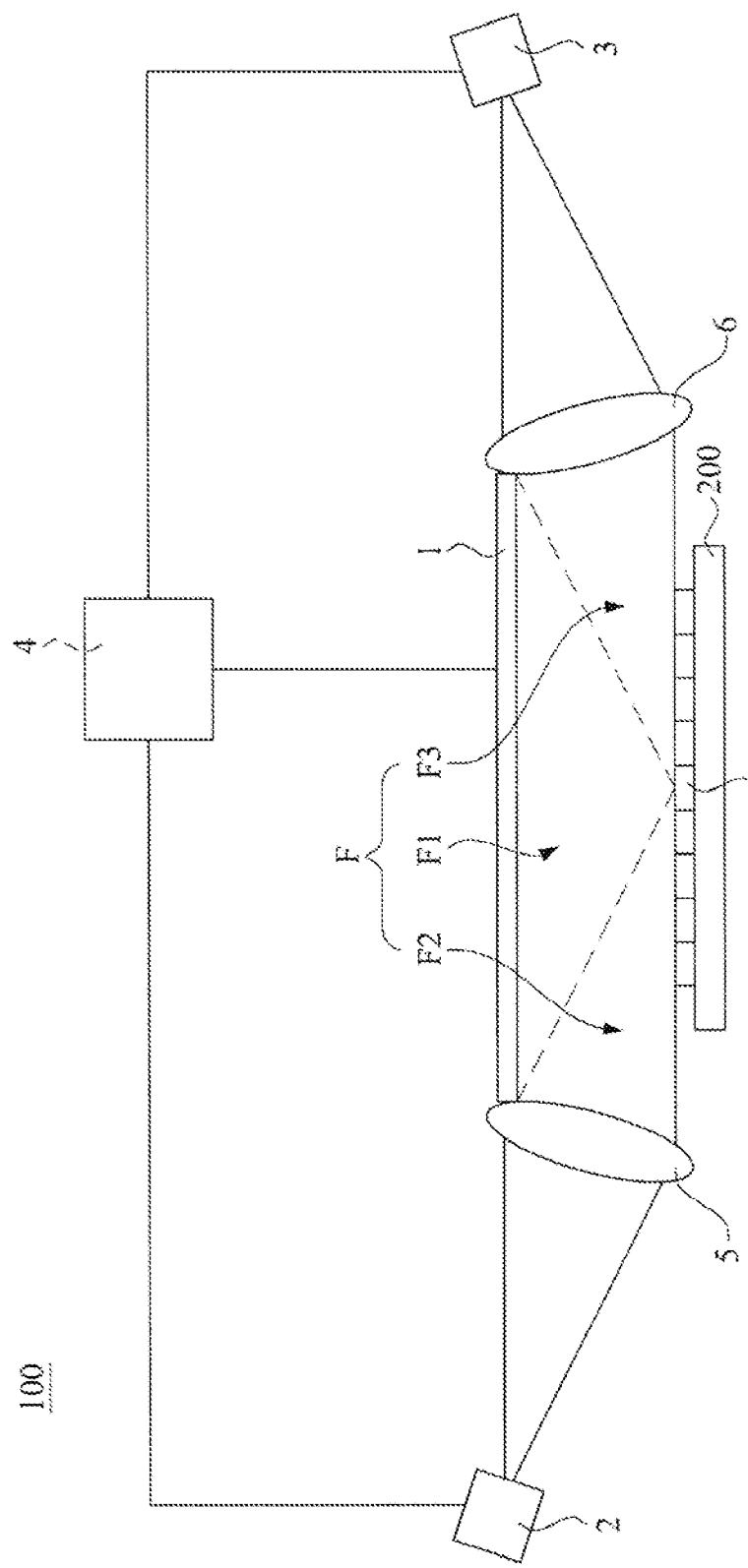
FIG. 3 is a perspective view showing a light receiving module dividing a projection light field of a light emitting component in the total luminous flux measurement system according to an embodiment of the present invention.
Figure 4:
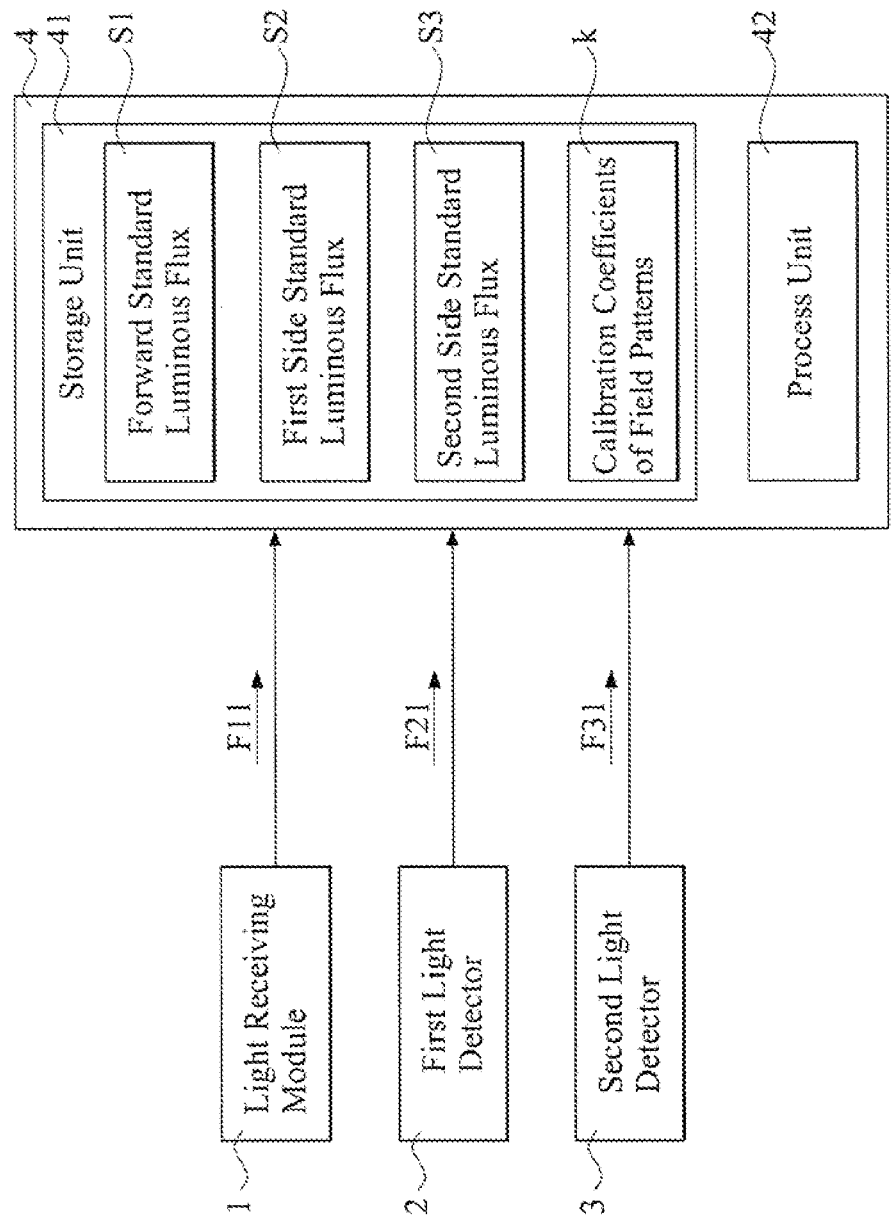
FIG. 4 is a diagram showing a structure of the total luminous flux measurement system according to an embodiment of the present invention.

Refer to FIG. 2 to FIG. 4. FIG. 2 is a perspective view showing a total luminous flux measurement system according to an embodiment of the present invention; FIG. 3 is a perspective view showing a light receiving module dividing a projection light field of a light emitting component in the total luminous flux measurement system according to an embodiment of the present invention; and FIG. 4 is a diagram showing a structure of the total luminous flux measurement system according to an embodiment of the present invention, light emitting module 200 includes a plurality of uncut light emitting components 201. According to an embodiment of the present invention, the light emitting module 200 includes an LED wafer and the light emitting components include LED chip dies. A total luminous flux measurement system 100 for measuring a total luminous flux of light emitting components 201 is provided, the total luminous flux measurement system 100 including a light receiving module 1, a first light detector 2, a second light detector 3, a processing module 4, a light concentrating component 5 and a light concentrating component 6.

The light receiving module 1 is disposed on a central normal n, divides a projection light field F of the light emitting components 201 into a forward light field F1, a side light field F2 and a side light, field F3, wherein the light receiving module 1 receives a beam projected by the light emitting components 201 in the forward light field F1 to obtain a forward luminous flux F11. According to an embodiment, the light receiving module 1 is selected from the group of solar energy panel and integrating sphere.

The first light detector 2 is disposed on a side of the light receiving module 1 and receives a beam projected by the light emitting components 201 in the side light field F2 to obtain a first side luminous flux F21, wherein the light concentrating component 5 is disposed between the first light detector 2 and the light emitting components 201 so that the beam projected by the light emitting components 201 in the side light field F2 is concentrated on the first light detector 2 and the beam projected by the light emitting components 201 in the side light field F2 is received by the first light detector 2.

The second light detector 3 is disposed opposite to the first light detector 2 on the light receiving module 1 and receives a beam projected by the light emitting components 201 in the side light field F3 to obtain a second side luminous flux F31, wherein the light concentrating component 6 is disposed between the second light detector 3 and the light emitting components 201 so that the beam projected by the light emitting components 201 in the side light field F3 is concentrated on the second light detector 3 and the beam projected by the light: emitting components 201 in the side light field F3 is received by the second light detector 3. According to an embodiment of the present invention, the first light detector 2 and the second light detector 3 are selected from the group of photodiode, solar cell and semiconductor component; the light concentrating component 5 and 6 include lenses.

Figure 5:
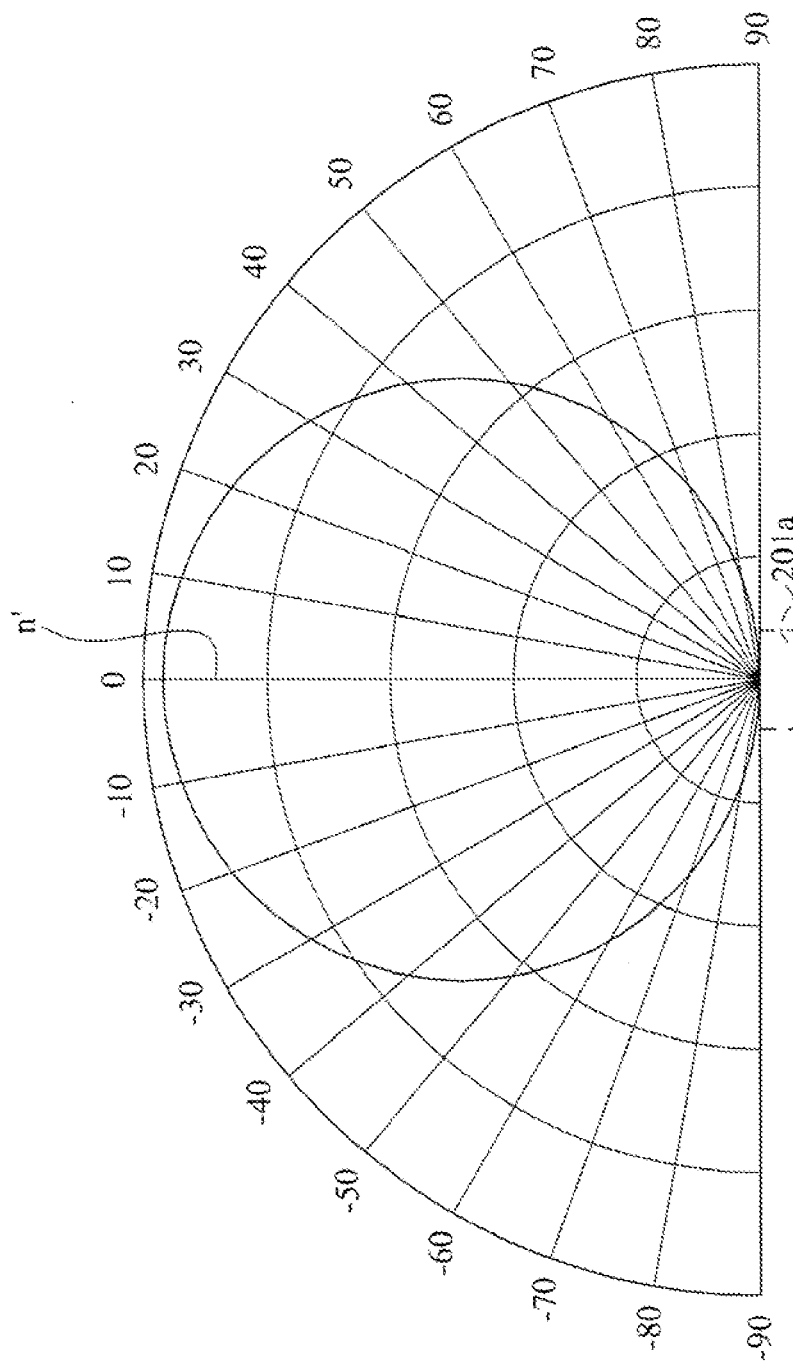
FIG. 5 is a perspective view showing a field pattern of a standard light emitting component according to an embodiment of the present invention.
Figure 6:
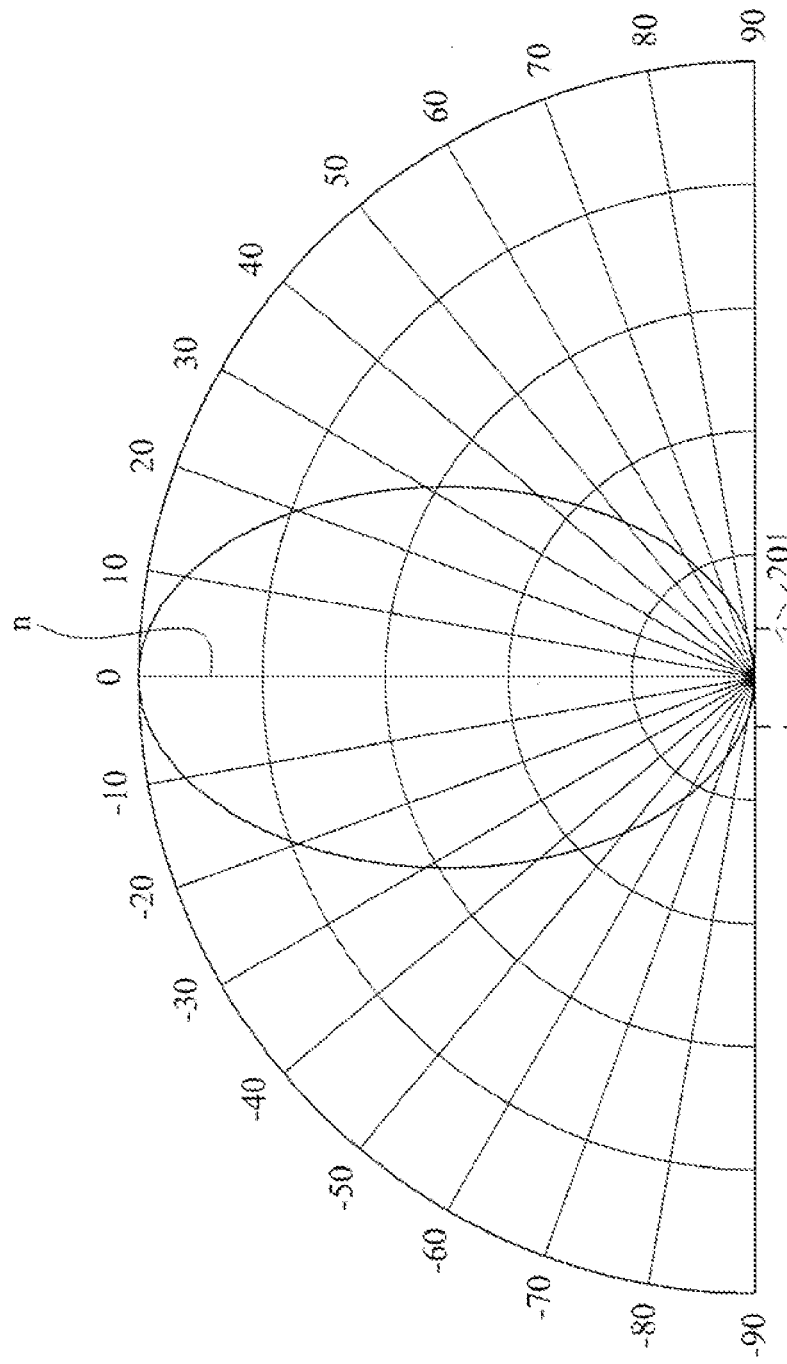
FIG. 6 is a perspective view showing the field pattern of the projection light field of the light emitting component concentrating on the central normal according to an embodiment of the present invention.
Figure 7:
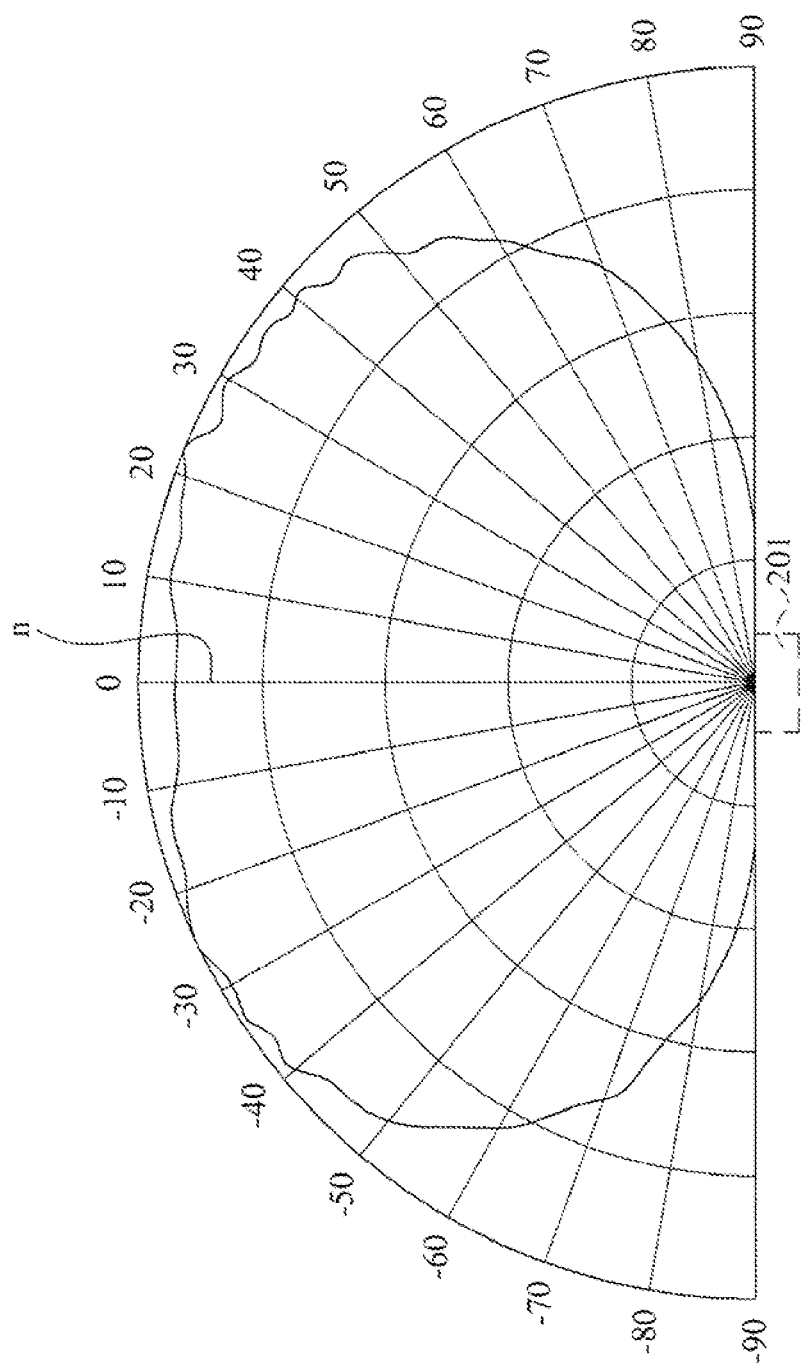
FIG. 7 is a perspective view showing the field pattern of the projection light field of the light emitting component being dispersive according to an embodiment of the present invention.

Refer to FIG. 3 to FIG. 7. FIG. 5 is a perspective view showing a field pattern of a standard light emitting component according to an embodiment of the present: invention; FIG. 6 is a perspective view showing the field pattern of the projection light field of the light emitting component concentrating on the central normal according to an embodiment of the present invention; and FIG. 7 is a perspective view showing the field pattern of the projection light field of the light emitting component being dispersive according to an embodiment of the present invention. The processing module 4 is electrically connected to the light receiving module 1, the first light detector 2 and the second light detector 3. The processing module 4 includes a storage unit 41 and a processing unit 42. The storage unit 41 stores a forward standard luminous flux S1 a first side standard luminous flux S2, a second side standard luminous flux S3 and a plurality of calibration coefficients of field patterns k. The processing unit 42 respectively compares the forward luminous flux F11, the first side luminous flux F21 and the second side luminous flux F31 with the forward standard luminous flux S1, the first side standard luminous flux S2 and the second side standard luminous flux S3 so as to determine the field pattern of the projection light field and to calculate the total luminous flux of the light emitting components 201 by selecting the calibration coefficients of field patterns k corresponding to the field pattern of the projection light field. According to FIG. 5, a standard light emitting component 201a includes a light emitting component with its field pattern of projection field in a circular shape. The standard light emitting component 201a includes a central normal if and the field pattern of the standard light emitting component 201a is in a circular shape around the central normal n' and is within 90 to −90 degree of the central normal n'. The forward standard luminous flux S1, the first side standard luminous flux S2 and the second side standard luminous flux S3 are data stored in the storage unit 41 by the total luminous flux measurement system 100 after measuring the standard light emitting component 201a.

Accordingly, when a ratio value (F11/F21) of the forward luminous flux F11 and the first side luminous flux F21 is close to a ratio value (S1/S2) of the forward standard luminous flux Si and the first side standard luminous flux S2, the field pattern of the light emitting components 201 is close to a field pattern of the standard light emitting component 201a. That is, the projection light field F of the light emitting components 201 is close to a circular shape. Since the light emitting components 201 are distributed symmetrically, the field pattern of the light emitting components 201 is determined according to the ratio value (F11/F21) and (S1/S2). Meanwhile, when a ratio value (F11/F31) of the forward luminous flux F11 and the second side luminous flux F31 is close to a ratio value (S1/S3) of the forward standard luminous flux S1 and the second side standard luminous flux S3, it is more accurate to determine that the field pattern of the projection light field F is close to a circular shape.

When the ratio value (F11/F21) of the forward luminous flux F11 and the first side luminous flux F21 is bigger than the ratio value (S1/S2) of the forward standard luminous flux S1 and the first side standard luminous flux S2, the field pattern of the projection light field F of the light emitting components 201 concentrates on the central normal n as shown in FIG. 6.

When the ratio value (F11/F21) of the forward luminous flux F11 and the first side luminous flux F21 is smaller than the ratio value (S1/S2) of the forward standard luminous flux S1 and the first side standard luminous flux S2, the field pattern of the projection light field F of the light emitting components 201 is dispersive as shown in FIG. 7.

Accordingly, when the first side luminous flux and the second side luminous flux are different, determine that the field pattern of the projection light field F is biased. For example, when the first side luminous flux F21 is bigger than the second side luminous flux F31, persons having ordinary skill in the art should understand that the field pattern of the projection light field F of the light emitting components 201 is biased toward the side light field F2.

After the processing unit 42 determines the field pattern of the projection light field F of the light emitting components 201, the processing unit 42 corrects the forward luminous flux F11, the first side luminous flux F21 and the second side luminous flux F31 so that the total luminous flux of the light emitting components 201 is measured accurately.

Figure 8:
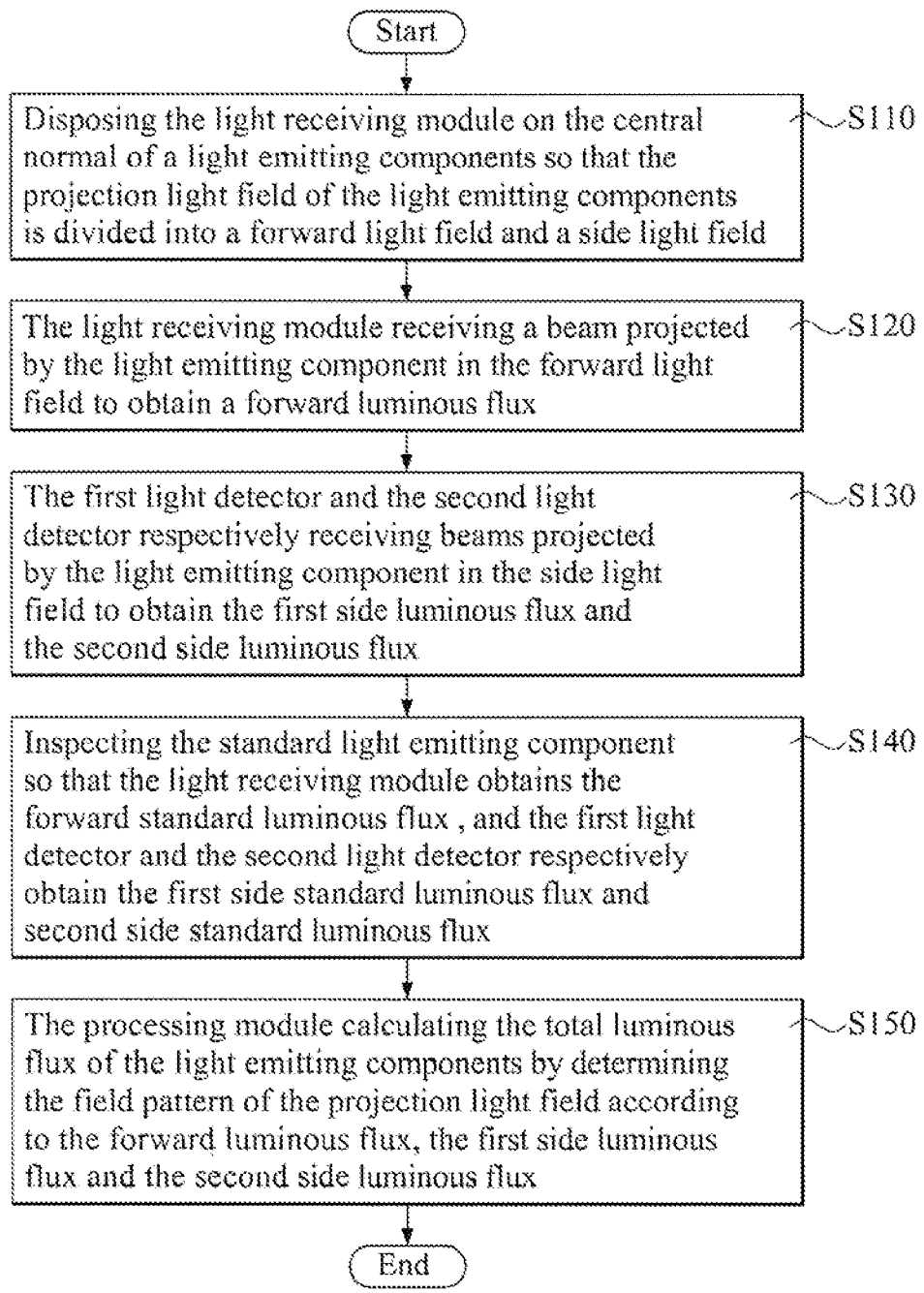
FIG. 8 shows a total luminous flux measuring method according to an embodiment of the present invention.

Refer to FIGS. 3, 4, 5 and 8. FIG. 8 shows a total luminous flux measuring method according to an embodiment of the present invention. The method includes following steps, S110: disposing the light receiving module 1 on the central normal n of the light emitting components 201 so that the projection light field of the light emitting components 201 is divided into the forward, light field F1, a side light field F2 and a side light field F3.

S120: the light receiving module 1 receiving a beam projected by the light emitting components 201 in the forward light field F1 to obtain the forward luminous flux F11.

S130: the first light detector 2 and the second light detector 3 respectively receiving beams projected by the light emitting components 201 in the side light field F2 and F3 to obtain the first side luminous flux F21 and the second side luminous flux F31.

S140: inspecting the standard light emitting component 201a so that the light receiving module 1 obtains the forward standard luminous flux S1, and the first light detector 2 and the second light detector 3 respectively obtain, the first side standard luminous flux S2 and second side standard luminous flux S3, wherein the forward standard luminous flux S1, the first side standard luminous flux S2 and second side standard luminous flux S3 are stored in the storage unit 41. According to an embodiment of the present invention, the standard light emitting component 201a includes a lambertian source having an even field distribution so the field pattern of its projection field is in a circular shape. In other embodiments, the method includes S140 being taken before S110 and is not limited to be taken after S130.

S150: the processing module 4 calculating the total luminous flux of the light, emitting components 201 by determining the field pattern of the projection light field F according to the forward luminous flux F11, the first side luminous flux F21 and the second side luminous flux F31.

In conclusion, compared with prior art, the total luminous flux measurement system and the total luminous flux measuring method according to the present invention include utilizing the light receiving component and the light detector to absorb beams in the projection field of the light emitting component, comparing the forward luminous flux, the first side luminous flux and the second side luminous flux with the standard luminous flux, the first side standard luminous flux and the second side standard luminous flux so as to determine the field pattern of the projection light field, and calculating the total luminous flux of the light emitting component by selecting the calibration coefficients of field patterns corresponding to the field pattern of the projection light field.

In other embodiment of the present invention, the first light detector and the second light detector directly aim at the light emitting component to absorb beams in the first side light field and the second light field. It is not necessary to additionally install light concentrating components. The processing unit calculates the total luminous flux of the light emitting component according to light receiving angles of the first light detector and the second light detector.

Meanwhile, according to an embodiment of the present invention, since the field pattern of ordinary light emitting component is usually symmetrical, even when the total luminous flux measurement system merely includes the light receiving module and the first light detector, it still obtains the field pattern of the light emitting component by symmetrical calculation and calculates the total luminous flux accordingly. When the first light detector and the second light detector are both utilized, the field pattern of the light emitting component is inspected more accurately and the total luminous flux is calculated accordingly.

While the present invention has been particularly shown and described with reference to a preferred embodiment, it will he understood by those skilled in the art that various changes in form and detail may be without departing from the spirit and scope of the present invention.

What is claimed is:

1. A total luminous flux measurement system for measuring a total luminous flux of a light emitting component, the light emitting component having a projection light field and a central normal, the total luminous flux measurement system comprising:
    a light receiving module, disposed on the central normal, the light receiving module dividing the projection light field into a forward light field and a side light field, the light receiving module for receiving a beam projected by the light emitting component in the forward light field to obtain a forward luminous flux;
    a first light detector, disposed on a side of the light receiving module, the first light detector for receiving a beam projected by the light emitting component in the side light field to obtain a first side luminous flux;
    a second light detector, disposed on a side of the light receiving module opposite to the first light detector, the second light detector for receiving a beam projected by the light emitting component in the side light field to obtain a second side luminous flux; and
    a processing module, electrically connected to the light receiving module and the first light detector, the processing module for calculating the total luminous flux of the light emitting component by determining a field pattern of the projection light field according to the forward luminous flux and the first side luminous flux, the processing module comprising:
        a storage unit, for storing a forward standard luminous flux, a first side standard luminous flux, a second side standard luminous flux and a plurality of calibration coefficients of field patterns; and
        a processing unit, for respectively comparing the forward luminous flux, the first side luminous flux and the second side luminous flux with the forward standard luminous flux, the first side standard luminous flux and the second side standard luminous flux so as to determine the field pattern of the projection light field, and selecting the calibration coefficients of field patterns corresponding to the field pattern of the projection light field so as to calculate the total luminous flux of the light emitting component.

2. The measurement system according to claim 1, further comprising:
    two light concentrating components, disposed respectively on two sides of the light receiving module and concentrating beams projected by the light emitting component in the side light field respectively on the first light detector and the second light detector.

3. A total luminous flux measuring method, the method comprising following steps:
    (a) disposing a light receiving module on a central normal of a light emitting component so that a projection light field of the light emitting component is divided into a forward light field and a side light field;
    (b) utilizing the light receiving module to receive a beam projected by the light emitting component in the forward light field to obtain a forward luminous flux;
    (c) utilizing a first light detector to receive a beam projected by the light emitting component in the side light field to obtain a first side luminous flux;
    (d) measuring a standard light emitting component so that the light receiving module can obtain a forward standard luminous flux and the first light detector can obtain a first side standard luminous flux; and
    (e) utilizing a processing module to calculate a total luminous flux of the light emitting component by determining a field pattern of the projection light field according to the forward luminous flux and the first side luminous flux, wherein determining that the field pattern of the projection light field is close to a field pattern of the projection light field of the standard light emitting component when a ratio value of the forward luminous flux and the first side luminous flux is close to a ratio value of the forward standard luminous flux and the first side standard luminous flux.

4. The method according to claim 3, further comprising a step:
    (f) utilizing a second light detector to receive a beam projected by the light emitting component in the side light field to obtain a second side luminous flux, the second light detector determining that the field pattern of the projection light field is biased when the first side luminous flux and the second side luminous flux are different.

5. A total luminous flux measuring method, the method comprising following steps:

(a) disposing a light receiving module on a central normal of a light emitting component so that a projection light field of the light emitting component is divided into a forward light field and a side light field;
(b) utilizing the light receiving module to receive a beam projected by the light emitting component in the forward light field to obtain a forward luminous flux;
(c) utilizing a first light detector to receive a beam projected by the light emitting component in the side light field to obtain a first side luminous flux;
(d) measuring a standard light emitting component so that the light receiving module can obtain a forward standard luminous flux and the first light detector can obtain a first side standard luminous flux; and
(e) utilizing a processing module to calculate a total luminous flux of the light emitting component by determining a field pattern of the projection light field according to the forward luminous flux and the first side luminous flux, wherein determining that the field pattern of the projection light field is dispersive when a ratio value of the forward luminous flux and the first side luminous flux is smaller than a ratio value of the forward standard luminous flux and the first side standard luminous flux.

6. A total luminous flux measuring method, the method comprising following steps:

(a) disposing a light receiving module on a central normal of a light emitting component so that a projection light field of the light emitting component is divided into a forward light field and a side light field;
(b) utilizing the light receiving module to receive a beam projected by the light emitting component in the forward light field to obtain a forward luminous flux;
(c) utilizing a first light detector to receive a beam projected by the light emitting component in the side light field to obtain a first side luminous flux;
(d) measuring a standard light emitting component so that the light receiving module can obtain a forward standard luminous flux and the first light detector can obtain a first side standard luminous flux; and
(e) utilizing a processing module to calculate a total luminous flux of the light emitting component by determining a field pattern of the projection light field according to the forward luminous flux and the first side luminous flux, wherein determining that the field pattern of the projection light field concentrates on the central normal when a ratio value of the forward luminous flux and the first side luminous flux is bigger than a ratio value of the forward standard luminous flux and the first side standard luminous flux.

\* \* \* \* \*